United States Patent
Ohno et al.

(10) Patent No.: US 12,372,463 B2
(45) Date of Patent: Jul. 29, 2025

(54) PROCESSING APPARATUS AND METHOD FOR CALCULATING REFRACTIVE INDEX DISTRIBUTION BASED ON LIGHT BEAM DATA, OPTICAL APPARATUS INCLUDING THE PROCESSING APPARATUS, MANUFACTURING APPARATUS FOR CREATING OPTICAL ELEMENT

(71) Applicant: KABUSHIKI KAISHA TOSHIBA, Tokyo (JP)

(72) Inventors: Hiroshi Ohno, Tokyo (JP); Takashi Usui, Saitama Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 17/652,490

(22) Filed: Feb. 25, 2022

(65) Prior Publication Data
US 2023/0080677 A1 Mar. 16, 2023

(30) Foreign Application Priority Data

Sep. 16, 2021 (JP) .................................. 2021-151132

(51) Int. Cl.
*G01N 21/45* (2006.01)
*G06N 3/084* (2023.01)

(52) U.S. Cl.
CPC ..... *G01N 21/455* (2013.01); *G01N 2201/126* (2013.01); *G06N 3/084* (2013.01)

(58) Field of Classification Search
CPC ......... G01N 2201/126; G01N 21/4133; G01N 2021/4153; G06N 3/084
See application file for complete search history.

(56) References Cited

U.S. PATENT DOCUMENTS

| 6,611,321 B1 | 8/2003 | Sasaki |
| 10,732,102 B2 | 8/2020 | Ohno et al. |
| 2010/0209603 A1* | 8/2010 | Hasegawa ................ G02B 1/11 427/164 |

(Continued)

FOREIGN PATENT DOCUMENTS

| CN | 1776411 A | * 5/2006 |
| JP | 2000-121499 A | 4/2000 |
| JP | 2008-209726 A | 9/2008 |

(Continued)

OTHER PUBLICATIONS

W.L. Howes, "Rainbow schlieren and its applications," Applied Optics, vol. 23, No. 14, pp. 2449-2460 (1984).

(Continued)

*Primary Examiner* — Hwa Andrew Lee
(74) *Attorney, Agent, or Firm* — Finnegan, Henderson, Farabow, Garrett & Dunner, LLP

(57) ABSTRACT

According to the embodiment, a processing apparatus includes an arithmetic section. The arithmetic section is configured to calculate a refractive index distribution forming a light beam path based on an estimated output calculated by inputting light beam data indicating the light beam path to an estimation model, an updated output calculated based on the light beam data and the estimated output, and an evaluation index of the estimation model calculated from a ray equation independent of a time which the light beam path follows.

16 Claims, 5 Drawing Sheets

(56) References Cited

U.S. PATENT DOCUMENTS

2017/0059468 A1* 3/2017 Yevick ............... G06N 20/10

FOREIGN PATENT DOCUMENTS

JP        2019-211246 A    12/2019
JP          6818702 B2    1/2021

OTHER PUBLICATIONS

H. Ohno et al., "Reconstruction method of axisymmetric refractive index fields with background oriented schlieren," Applied Optics, vol. 57, No. 30, pp. 9062-9069 (2018).

R. Wu et al., "Lithium niobate micro-disk resonators of quality factors above 107," Optics Letters, vol. 46, No. 17, pp. 4116-4119 (2021).

H. Ohno "Symplectic ray tracing based on Hamiltonian optics in gradient-index media," J. of the Optical Society of America A, vol. 37, No. 3, pp. 411-416 (2020).

H. Ohno, "One-shot three-dimensional measurement method with the color mapping of light direction," OSA Continuum, vol. 4, No. 3, pp. 840-848 (2021).

S. Greydanus, "Hamiltonian Neural Networks," arXiv:1906.01563v3, 16 pages (2019).

H. Ohno et al., "Gradient-index dark hole based on conformal mapping with etendue conservation," Optics Express, vol. 27, No. 13, pp. 18493-18507 (2019).

Hiroshi Ohno et al., "Points-connecting neural network ray tracing," Optics Letters, vol. 46, No. 17, pp. 4116-4119 (2021).

* cited by examiner

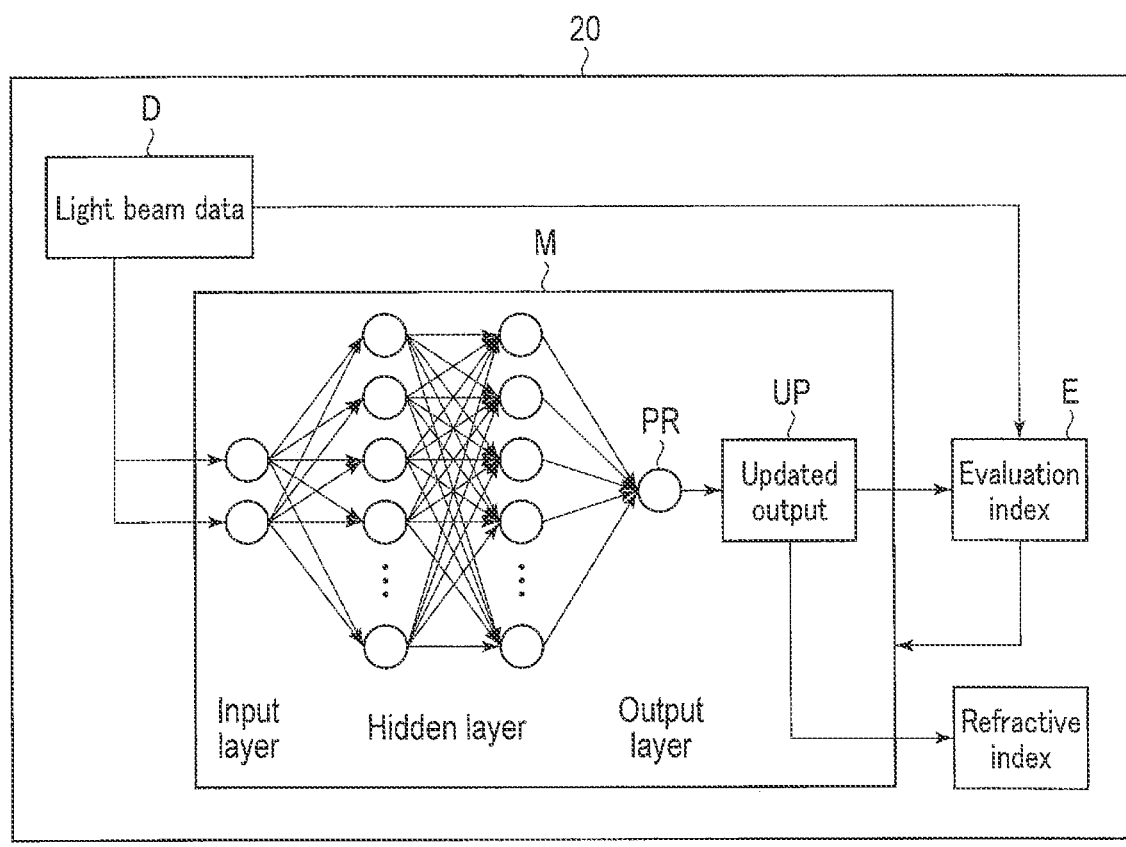
F I G. 3

PROCESSING APPARATUS AND METHOD FOR CALCULATING REFRACTIVE INDEX DISTRIBUTION BASED ON LIGHT BEAM DATA, OPTICAL APPARATUS INCLUDING THE PROCESSING APPARATUS, MANUFACTURING APPARATUS FOR CREATING OPTICAL ELEMENT

CROSS-REFERENCE TO RELATED APPLICATIONS

This application is based upon and claims the benefit of priority from Japanese Patent Application No. 2021-151132, filed Sep. 16, 2021, the entire contents of all of which are incorporated herein by reference.

FIELD

Embodiments described herein relate generally to a processing apparatus, an optical apparatus, a manufacturing apparatus, a processing method, and a non-transitory storage medium storing a program.

BACKGROUND

In various industries, inspection for obtaining information of an object is performed. In this inspection, light is caused to enter an object or a medium and a change (deflection) in the travel direction of the light with respect to the incident direction of the light is obtained. Then, the deflection of the light is analyzed to obtain information of the object. The case in which information of an object can be obtained in the manner as described above is limited to a case in which the light beam path can be formulated as a mathematical formula and the object information can be calculated analytically backward from the light beam path. Therefore, a technique capable of generally using the method of obtaining information of an object based on a light beam path is required.

BRIEF DESCRIPTION OF THE DRAWINGS

FIG. 3 is a schematic view schematically showing an example of refractive index calculation processing according to the first embodiment;

DETAILED DESCRIPTION

An object of an embodiment is to provide a processing apparatus, an optical apparatus, a manufacturing apparatus, a processing method, and a non-transitory storage medium storing a program capable of generally obtaining information of an object based on a light beam path.

According to the embodiment, a processing apparatus includes an arithmetic section. The arithmetic section is configured to calculate a refractive index distribution forming a light beam path based on an estimated output calculated by inputting light beam data indicating the light beam path to an estimation model, an updated output calculated based on the light beam data and the estimated output, and an evaluation index of the estimation model calculated from a ray equation independent of a time which the light beam path follows.

Embodiments will be described hereinafter with reference to the accompanying drawings. Each drawing is schematic or conceptual and the relationship between the thickness and the width of each part and the size ratio between the respective parts are not necessarily the same as actual ones. In addition, even when the same portions are shown, the portions are sometimes shown in different dimensions and ratios depending on the drawings. A detailed description of the content already referred to will be omitted as appropriate.

First Embodiment

Figure 1:
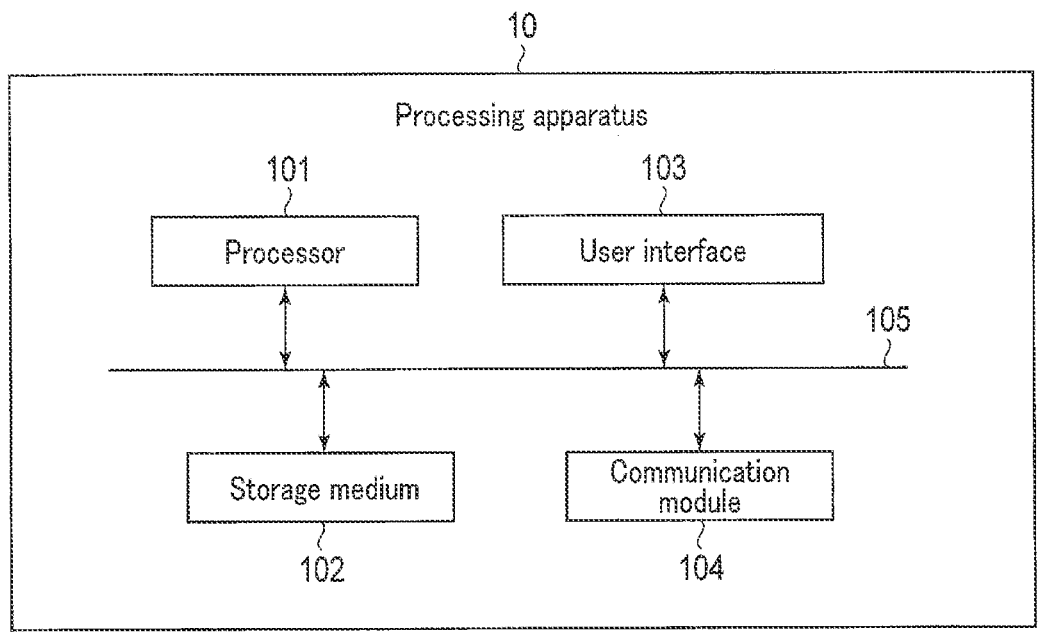
FIG. 1 is a block diagram showing an example of the arrangement of a processing apparatus according to the first embodiment.

FIG. 1 is a view showing an example of the arrangement of a processing apparatus 10. The processing apparatus 10 is, for example, a computer. The processing apparatus 10 includes, for example, a processor 101, a storage medium 102, a user interface 103, and a communication module 104. The processor 101, the storage medium 102, the user interface 103, and the communication module 104 are connected to each other via a bus 105.

The processor 101 includes any one of a CPU (Central Processing Unit), a GPU (Graphics Processing Unit), an ASIC (Application Specific Integrated Circuit), a microcomputer, an FPGA (Field Programmable Gate Array), a DSP (Digital Signal Processor), and the like. The storage medium 102 can include an auxiliary memory device in addition to a main memory device such as a memory.

The main memory device is a non-transitory storage medium. The main memory device is, for example, a non-volatile random access memory such as an HDD (Hard Disk Drive) or an SSD (Solid State Drive), a non-volatile memory such as a ROM (Read Only Memory), or the like. A combination of the above-described non-volatile memories may be used. The auxiliary memory device is a tangible storage medium. A combination of the above-described non-volatile memory and a volatile memory such as an RAM (Random Access Memory) is used as the auxiliary memory device. Only one processor 101 and only one storage medium 102 may be provided in the processing apparatus 10, or a plurality of the processors 101 and a plurality of the storage media 102 may be provided.

In the processing apparatus 10, the processor 101 performs processing by executing a program or the like stored in the storage medium 102. Further, in the processing apparatus 10, a program executed by the processor 101 may be stored in a computer (server) connected via a network such as the Internet, or a server or the like in a cloud environment. In this case, the processor 101 downloads the program via the network.

In the user interface 103, various kinds of operations and the like are input by a user of the processing apparatus 10, and information to be notified to the user or the like is notified by displaying it or the like. The user interface 103 may be a display unit such as a display, or an input unit such as a touch panel or a keyboard. Note that a device connected to the processing apparatus 10 may be used as the input unit, or an input unit of another processing apparatus capable of communication via the network may be used.

Next, a function of obtaining information of an object based on the deflection of light, which is implemented by the processing apparatus 10 according to the first embodiment, will be described. The processing apparatus 10 includes an arithmetic section 20. The function of the arithmetic section 20 is implemented by, for example, the processor 101. Note that not all the processing operations performed by the arithmetic section 20 may be performed by the processor 101. In a given example, some of the processing operations performed by the arithmetic section 20 may be performed by another processing apparatus connected via the network. In another given example, another processing apparatus connected via the network may implement all the functions of the arithmetic section 20. When another processing apparatus connected via the network is used as described above, the processing apparatus 10 may function as a primary and the other processing apparatus may be used as a replica. Alternatively, the processing apparatus 10 may function as a replica of the other processing apparatus. The processing apparatus 10 can select to be a primary or a replica as appropriate depending on the function of the arithmetic section 20 implemented by the other processing apparatus.

The processing apparatus 10 in this embodiment obtains, based on the deflection of light, the refractive index distribution as the information of an object. Here, light is defined as an electromagnetic wave with no limitation of wavelength. Light may be any one of, for example, visible light, an X-ray, an infrared ray, a far-infrared ray, a millimeter wave, a microwave, and the like. The visible light has, for example, a wavelength of 430 nm (inclusive) to 750 nm (inclusive). In addition, each of all objects including a medium (spatial medium) in which light propagates in a space has a refractive index n defined based on the wavelength of light. Note that the spatial medium may be a vacuum. When light propagates in the spatial medium, the spatial medium may gradually absorb the light. For example, the refractive index of light is 1 in any wavelength region in a vacuum, and the refractive index of light is almost 1 in any wavelength region even in air. The refractive index of glass is about 1.5 in the wavelength region of visible light, and the refractive index of water is about 1.3 in the wavelength region of visible light.

Letting n be the refractive index of light, and u be the unit direction vector of light, a momentum vector of light P can be written as equation (1):

$$P = nU \quad (1)$$

At this time, letting Q be the position vector of light, the ray equation of light can be written as equation (2) (see Optics Letters, 2021, Vol. 46. No. 17, pp. 4116-4119, and see Journal of the Optical Society of America A, 2020, Vol. 37, No. 3, pp. 411-416):

$$\frac{dP}{dt} = \frac{c}{n} \frac{\partial n}{\partial Q} \quad (2)$$

Here, c is the velocity of light in a vacuum, and t is time.

In equation (2), letting (x, y, z) be the spatial orthogonal coordinates, a minute time element dt can be written as equation (3):

$$dt = \frac{n\sqrt{1 + x'^2 + y'^2}}{c} dz \quad (3)$$

Here, dz is a minute spatial element. Since x' and y' are differential coefficients to z, x' and y' can be written as equation (4) and equation (5), respectively:

$$x' = \frac{dx}{dz} \quad (4)$$

$$y' = \frac{dy}{dz} \quad (5)$$

From the property of light derived from Maxwell's equations, the velocity of light c in a vacuum is always a constant, and independent of time and the spatial position. On the other hand, in a case of a general object, the velocity is dependent on time. For example, when a ball is thrown far away, the velocity of the ball gradually decreases depending on time. That is, the constant velocity c is a special property of light.

In the right-hand side of equation (3), x' and y' are differential coefficients of x and y to the special coordinates z, respectively, and dz is the minute spatial element. For all of them, the refractive index n is a quantity independent of time. Accordingly, in equation (3), the minute time element dt is described using the spatial elements alone. Further, by substituting equation (1) and equation (3) into the ray equation expressed by equation (2), equation (6) can be obtained. Accordingly, the ray equation expressed by equation (2) is an equation independent of time. It is a special property of light that the ray equation can be expressed, as described above, as an evolution equation not for time but for spatial coordinates.

$$\frac{d(nU)}{dz} - \sqrt{1 + x'^2 + y'^2} \frac{\partial n}{\partial Q} = 0 \quad (6)$$

Here, a three-dimensional position vector Q is determined as expressed by equation (7) using a two-dimensional vector q and the spatial coordinate z:

$$Q \equiv \begin{pmatrix} q \\ z \end{pmatrix} = \begin{pmatrix} x \\ y \\ z \end{pmatrix} \quad (7)$$

Similarly, the three-dimensional unit direction vector U is determined as expressed by equation (8) using a two-dimensional vector u and the spatial coordinate uz:

$$U \equiv \begin{pmatrix} u \\ u_z \end{pmatrix} = \begin{pmatrix} u \\ \sqrt{1 - u \cdot u} \end{pmatrix} \quad (8)$$

In equation (8), the spatial coordinate uz is a quantity which is determined when the magnitude of the three-dimensional unit direction vector U is 1. Accordingly, the spatial coordinate uz is calculated from the two-dimensional direction vector u as expressed by the right-hand side of equation (8). By using equation (7) and equation (8), equation (6) can be written as equation (9):

$$\frac{d(nu)}{dz} - \sqrt{1 + q' \cdot q'} \frac{\partial n}{\partial q} = 0 \quad (9)$$

As can be found from equation (9), the ray equation is defined in the orthogonal coordinate space and described with one coordinate variable (the spatial coordinate z here) as an intermediary parameter.

When the light beam path is determined from equation (9), the position vector q, the direction vector u, and the spatial coordinate uz of the light beam are determined. If q, u, and uz are determined as described above, the only unknown number in equation (9) is n. Accordingly, by solving equation (9) as an equation with the refractive index n as an unknown number, the refractive index n can be decided from the light beam path.

Figure 2:
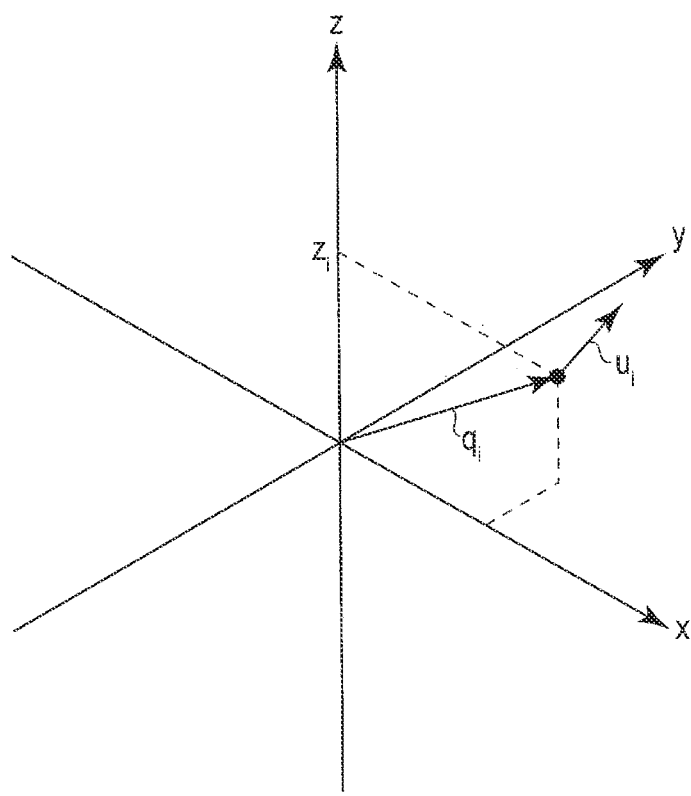
FIG. 2 is a view for explaining a discretized space used in a refractive index calculation method according to the first embodiment.

In order to obtain the refractive index n from equation (9), equation (9) is discretized in this embodiment. That is, as shown in FIG. 2, grid points (grid) are defined in the space, and the position vector q and the direction vector u of light at each grid point are determined. In addition, the refractive index n is determined at each grid point. Letting i (i is an integer) be the grid point number, let qi be the position vector, ui be the direction vector, and ni be the refractive index at the grid point number i. The coordinates of a spatial element of the discretized light beam path are determined in the orthogonal coordinate space.

FIG. 3 is a schematic view schematically showing an example of refractive index calculation processing. The arithmetic section 20 of the processing apparatus 10 in this embodiment calculates the refractive index n in above-described equation (9) according to the schematic view shown in FIG. 3. The arithmetic section 20 handles the above-described position vector qi, direction vector ui, and intermediary parameter z as light beam data D. That is, the light beam data D includes the position vector qi, the direction vector ui, and the intermediary parameter z. Each of the position vector qi, the direction vector ui, and the intermediary parameter z is one component of coordinates determined in the orthogonal coordinate space. The arithmetic section 20 utilizes an estimation model M to calculate the refractive index ni. The estimation model M is, for example, a neural network model (NN model). The neural network model includes an input layer, a hidden layer, and an output layer. The arithmetic section 20 inputs the light beam data D to the input layer of the neural network model. By utilizing the neural network model, the arithmetic section 20 calculates an estimated output PR based on the light beam data D. Based on the light beam data D and the current estimated output PR, the arithmetic section 20 calculates the refractive index ni as an updated output UP. The updated output UP is calculated by, for example, equation (10). Note that in equation (10), a is the estimated output RP, which is the value output from the neural network model. In addition, a is the quantity determined for each grid point number i. Therefore, a may be read as ai.

$$f = f(q_i, z_i, a) \quad (10)$$

The arithmetic section 20 calculates an evaluation index E based on equation (11):

$$g(u, q, z, \mu) \equiv \left| \frac{d(\mu u)}{dz} - \sqrt{1 + q' \cdot q'} \frac{\partial \mu}{\partial q} \right|^2 \quad (11)$$

The evaluation index E indicates a deviation (error) between the refractive index ni obtained in the current estimated output PR and the actual refractive index in the light beam path which forms the light beam data D. That is, if the value in equation (11) is 0, equation (9) holds, and the actual refractive index in the light beam path which forms the light beam data D is decided. The arithmetic section 20 in this embodiment transmits the evaluation index E to the neural network model based on an error back-propagation method. In the neural network model, a predetermined operation is executed so as to decrease the evaluation index. The arithmetic section 20 obtains the estimated output PR again from the neural network model. Based on the light beam data D and the updated estimated output PR, the arithmetic section 20 calculates the updated refractive index ni as the updated output UP. The arithmetic section 20 calculates the evaluation index E again. The arithmetic section 20 repeatedly executes these operations. The arithmetic section 20 executes these operations until the evaluation index E becomes smaller than a preset threshold value. The threshold value is, for example, 1 or less. In this manner, the arithmetic section 20 iteratively optimizes the neural network model (estimation model) based on the evaluation index E. With the processing described above, the arithmetic section 20 calculates, based on the light beam data D, the refractive index in the light beam path which forms the light beam data D.

Figure 4:
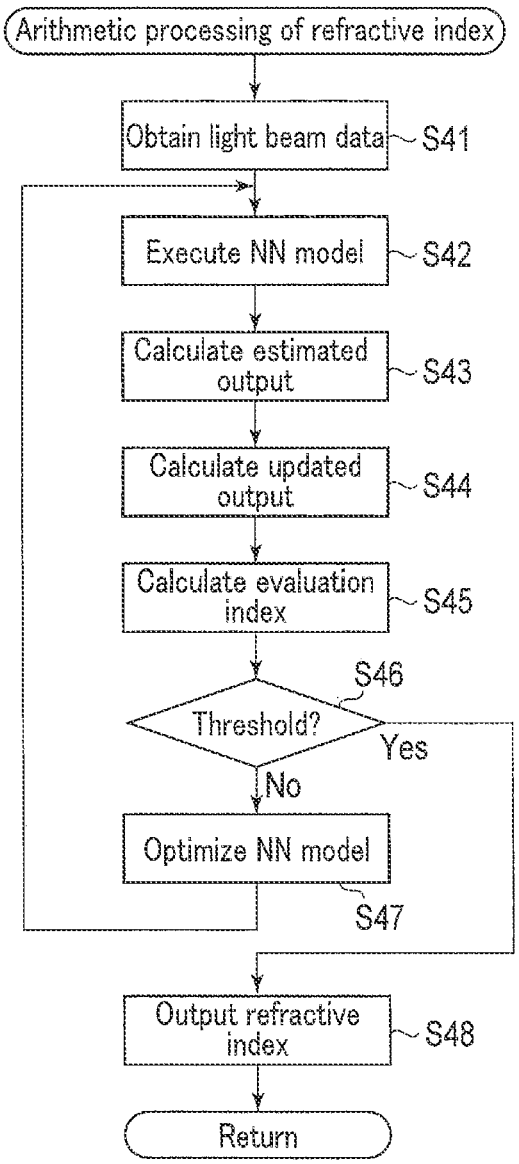
FIG. 4 is a flowchart for explaining an example of refractive index arithmetic processing performed by the processing apparatus according to the first embodiment.

FIG. 4 is a flowchart for explaining an example of processing performed in the arithmetic section 20. The arithmetic section 20 obtains the light beam data D (step S41). The light beam data D may be input via the user interface provided in the processing apparatus 10, or may be obtained from the outside via the communication module. The arithmetic section 20 processes the light beam data D in the neural network model (step S42), and obtains the estimated output PR as an output (step S43). The arithmetic section 20 calculates, based on the estimated output PR, the refractive index as the updated output UP (step S44). The arithmetic section 20 calculates the evaluation index E based on equation (11) (step S45). The arithmetic section 20 determines whether the calculated evaluation index E is smaller than the predetermined threshold value (step S46). If the evaluation index E is equal to or larger than the predetermined threshold value (No in step S46), the arithmetic section 20 transmits the evaluation index E to the neural network model by the error back-propagation method, and optimizes the neural network model (step S47). Then, the process returns to step S42, and the arithmetic section 20 performs the processing from step S43. If the evaluation index E is smaller than the predetermined threshold value (Yes in step S46), the arithmetic section 20 considers that the refractive index in the light beam path which forms the input light beam data D has been obtained, and outputs the final updated output UP as the calculated refractive index (step S48). In the manner as described above, the arithmetic section 20 in this embodiment calculates the refractive index based on the light beam data D.

As has been described above, in this embodiment, the processing apparatus 10 includes the arithmetic section 20. Based on the estimated output PR calculated by inputting the light beam data D indicating the light beam path to the estimation model M, the updated output UP calculated based on the light beam data D and the estimated output PR, and the evaluation index E calculated from the ray equation independent of a time which the light beam path follows, the arithmetic section 20 calculates the refractive index distribution forming the light beam path. Therefore, in this embodiment, even if the refractive index distribution cannot be analytically calculated from the light beam path, the ray equation is expressed as an evolution equation for coordinates, and the light beam path can be handled as information determined by the coordinates. With this, it is possible to calculate the refractive index that implements the light beam path.

On the other hand, if the ray equation is dependent on time, the refractive index cannot be calculated from the spatial coordinate information of the light beam path alone. That is, in order to calculate the refractive index, information of the time-evolving light beam path is required. This can be found from a fact that if the ray equation is dependent on time, at least the light beam path, which is dependent on time, and the information of the refractive index are required to satisfy the ray equation. At this time, if the ray equation is satisfied by the light beam path, which is independent of time, and the refractive index, it can be said that the ray equation is independent of time. Regarding this, if the ray equation is dependent only on the spatial coordinates as in this embodiment, in order to satisfy the ray equation, it is sufficient to obtain the light beam path, which is dependent on the spatial coordinates, and the information of the refractive index. In other words, the refractive index can be theoretically calculated from the spatial coordinate information of the light beam path only when the ray equation can be expressed as the evolution equation for the spatial coordinates. Therefore, the processing apparatus 10 in this embodiment can generally obtain the information of an object based on a light beam path.

In this embodiment, the light beam data D is preferably expressed using, as the intermediary parameter, the coordinate of the spatial element obtained by discretizing the light beam path. By discretizing and handling the light beam data in this manner, the processing apparatus 10 in this embodiment can numerically solve the equation based on equation (9). Accordingly, even if the light beam path cannot be expressed analytically, it is possible to generally obtain the information of the object based on the light beam path.

In this embodiment, it is preferable that the ray equation is expressed using the intermediary parameter and the refractive index distribution is calculated as the refractive index of the spatial element. By expressing the ray equation and the refractive index as described above, it is possible to calculate the refractive index distribution for each spatial element based on the result obtained by numerically solving the ray equation. Therefore, for example, by appropriately adjusting the size of the spatial element, it is possible to output the refractive index distribution that satisfies the accuracy required for the calculation result.

In this embodiment, it is preferable that the estimation model is the neural network model and the neural network mode is optimized based on the error propagation method with the evaluation index as the error. By using the neural network model as the estimation model, it is possible to appropriately calculate the refractive index distribution forming a predetermined light beam path.

Second Embodiment

Figure 5:
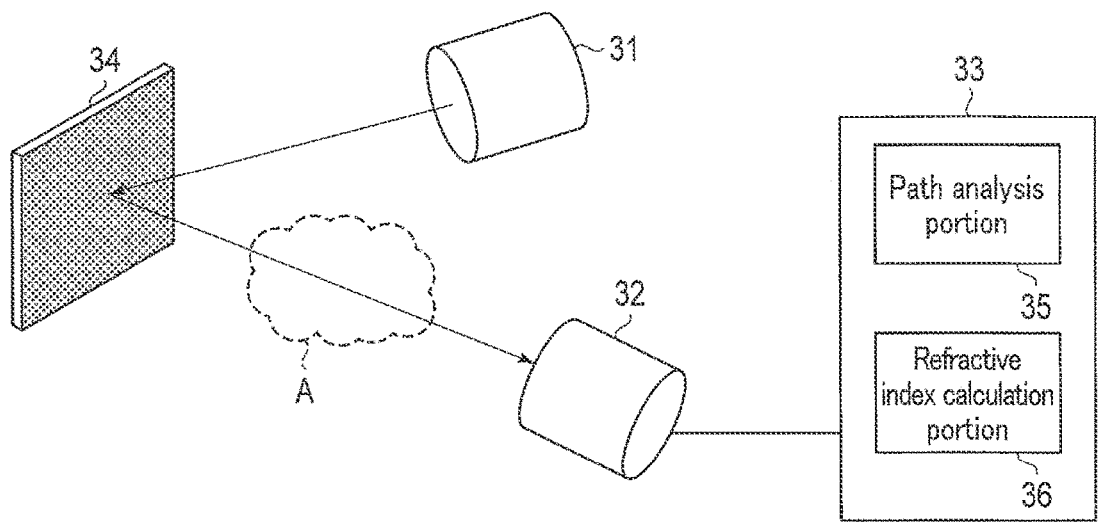
FIG. 5 is a schematic view showing an example of an optical apparatus according to the second embodiment.

FIG. 5 is a schematic view showing an example of an optical apparatus according to the second embodiment. An optical apparatus 30 according to the second embodiment includes an illumination portion 31, an image capture 32, a processing portion 33, and a background pattern 34. The processing portion 33 includes a path analysis portion 35 and a refractive index calculation portion 36. Also in this embodiment, light is defined as an electromagnetic wave as in the first embodiment. A light source of the illumination portion 31 is, for example, an LED (Light Emitting Device). The illumination portion 31 emits light (illumination light) toward the background pattern 34. The image capture 32 captures the light reflected by the background pattern 34 and generates image capturing data. For example, the image capturing data may be a monochrome image, or may be a color image having three channel colors such as R, G, and B. The image includes a plurality of pixels, and each pixel has a pixel value of, for example, 0 to 255. In a case of the color image, each pixel has a pixel value corresponding to the channel count corresponding to the colors. The processing portion 33 performs predetermined processing based on the image capturing data input from the image capture 32. The processing portion 33 is, for example, a computer, and may have the arrangement similar to that of the processing apparatus 10 in the first embodiment.

The path analysis portion 35 calculates the light beam path based on the image capturing data input from the image capture 32. The light beam path calculation method is, for example, the background schlieren method described in Applied Optics, 2018, Vol. 57, No. 30, pp. 9062-9069. Based on the calculated light beam path, the processing portion 33 calculates a position vector q and a direction vector u of the light at each grid point (x, y, z) defined in the first embodiment. The refractive index calculation portion 36 calculates, based on the position vector q and the direction vector u of the light calculated by the processing portion 33, the refractive index distribution forming the light beam path. The refractive index calculation portion 36 is the processing apparatus 10 according to the first embodiment. That is, the refractive index calculation portion 36 inputs the position vector q and the direction vector u of the light as the light beam data to the estimation model and performs the arithmetic processing similar to that in the first embodiment, thereby calculating a refractive index ni at each grid point.

In this embodiment, a medium (object) whose refractive index distribution is calculated is arranged as a measurement target A between the image capture 32 and the background pattern 34. The medium is not particularly limited as long as it transmits the light of the illumination portion 31 reflected by the background pattern 34. For example, if the light is visible light, the medium is water, glass, air, or the like. If a temperature distribution exists in the measurement target A (if the temperature of the measurement target A changes depending on the position), the refractive index distribution corresponding to the temperature distribution is generated in the measurement target A. In this embodiment, the light beam path is calculated by inputting the image capturing data from the image capture 32 to the path analysis portion 35 as described above, and the refractive index calculation portion 36 calculates a refractive index ni at each grid point in the light beam path based on the light beam data obtained from the light beam path. Accordingly, by using the optical apparatus 30 of this embodiment, it is possible to calculate the refractive index distribution in the light beam path. Therefore, in the optical apparatus 30 of this embodiment, it is possible to decide the refractive index distribution of the medium serving as the measurement target A arranged on the light beam path.

Third Embodiment

Figure 6:
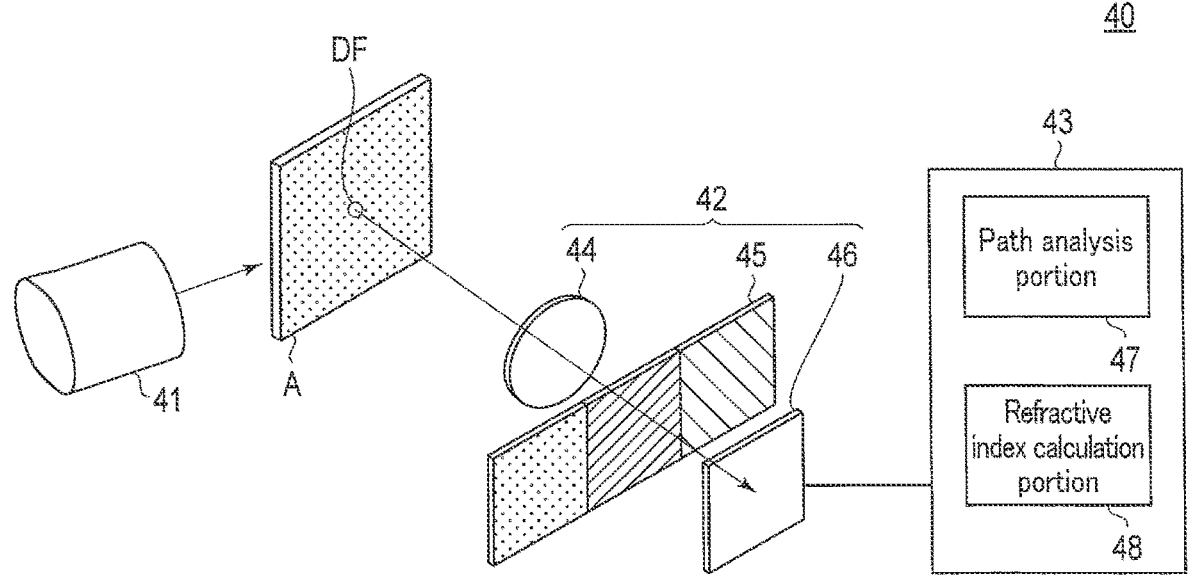
FIG. 6 is a schematic view showing an example of an optical apparatus according to the third embodiment.

FIG. 6 is a schematic view showing an example of an optical apparatus according to the third embodiment. An optical apparatus 40 according to the third embodiment includes an illumination portion 41, an image capture 42, and a processing portion 43. The image capture 42 includes an imaging optical element 44, a light beam selection portion 45, and an image sensor 46. The processing portion 43 includes a path analysis portion 47 and a refractive index calculation portion 48. Also in this embodiment, light is defined as an electromagnetic wave as in the first embodiment. The illumination portion 41 has the arrangement similar to that of the illumination portion 31 in the second embodiment, the processing portion 43 has the arrangement similar to that of the processing portion 33 in the second embodiment, the path analysis portion 47 has the arrangement similar to that of the path analysis portion 35 in the second embodiment, and the refractive index calculation portion 48 has the arrangement similar to that of the refractive index calculation portion 36. Accordingly, the refractive index calculation portion 48 is the processing apparatus 10 according to the first embodiment. In this embodiment, from the light incident side of the image capture 42, the imaging optical element 44, the light beam selection portion 45, and the image sensor 46 are arranged in this order.

The imaging optical element 44 images the light having entered the image capture 42 on the image sensor 46. The light beam selection portion 45 includes wavelength selection regions. Each wavelength selection region of the light beam selection portion 45 is, for example, a color filter that transmits light in a unique wavelength region and blocks transmission of light in a wavelength outside the unique wavelength region. In this embodiment, the light beam selection portion 45 includes three selection regions, and the respective selection regions transmit light beams in different wavelength regions. Accordingly, the light transmitted through each selection region is color-coded in accordance with the light incident direction with respect to the selection region. The image sensor 46 obtains the image capturing data based on the light color-coded in according with the light beam direction by the light beam selection portion 45.

The path analysis portion 47 calculates the light beam path based on the image capturing data input from the image capture 42. The light beam path calculation method is, for example, a method of color-mapping the light beam direction described OSA Continuum, 2021, Vol. 4, No. 3, pp. 840-848. The processing portion 43 calculates a position vector q and a direction vector u of the light as in the second embodiment. The refractive index calculation portion 48 inputs the position vector q and the direction vector u of the light as the light beam data to the estimation model and performs the arithmetic processing similar to that in the first embodiment, thereby calculating a refractive index ni at each grid point.

In this embodiment, an object whose refractive index distribution is calculated is arranged as a measurement target A between the illumination portion 41 and the image capture 42. The object is not particularly limited as long as it transmits the light of the illumination portion 31. For example, if the light is visible light, the object is glass, a transparent plastic, a thin metal which transmits light, or the like. For example, if a small defect DF exists in the measurement target A, this defect DF causes deflection of the light from the illumination portion 41 illuminating the measurement target A. The image capture 42 obtains the color-mapped image capturing data as described above. The path analysis portion 47 calculates, based on the image capturing data, the light beam path utilizing the above-described method or the like. The refractive index calculation portion 48 calculates, based on the light beam data obtained from the light beam path, the refractive index ni at each grid point in the light beam path. Accordingly, by using the optical apparatus 40 of this embodiment, it is possible to calculate the refractive index distribution in the light beam path. Therefore, in the optical apparatus 40 of this embodiment, it is possible to obtain the refractive index distribution (the spatial distribution of refractive index) caused by the defect in the object serving as the measurement target A.

In a given example, the optical apparatus 40 according to this embodiment is used to measure, in advance, the refractive index distribution (the refractive index distribution serving as a reference) in a measurement target (a measurement target serving as a reference) with substantially no defect. Then, the optical apparatus 40 of this embodiment is used to measure the refractive index distribution of the measurement target A to be inspected. By comparing the refractive index distribution serving as the reference with the refractive index distribution of the measurement target to be inspected, it is possible to detect a defect in the measurement target to be inspected.

Fourth Embodiment

Figure 7:
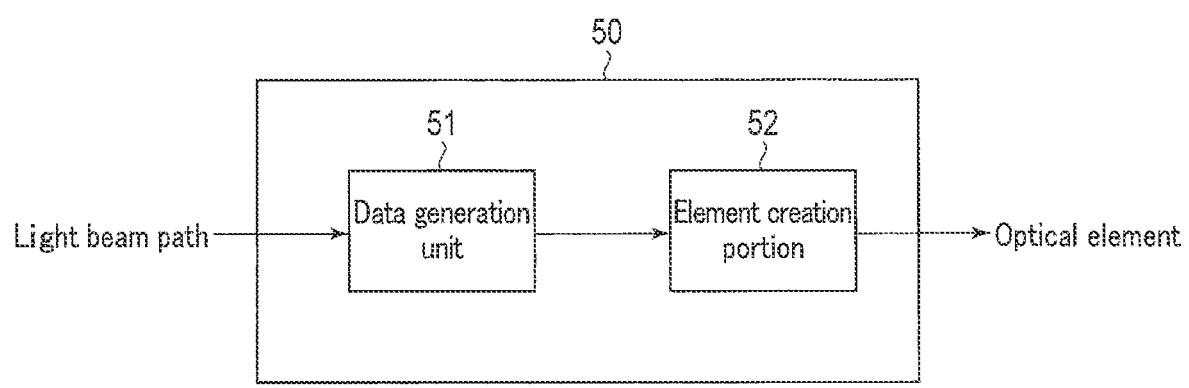
FIG. 7 is a schematic view showing an example of an optical apparatus according to the fourth embodiment.

FIG. 7 is a schematic view showing an example of a manufacturing apparatus according to the fourth embodiment. A manufacturing apparatus 50 according to the fourth embodiment includes a data generation portion 51 and an element creation portion 52. The data generation portion 51 is one of the processing apparatus 10 of the first embodiment, the optical apparatus 30 of the second embodiment, and the optical apparatus 40 of the third embodiment. The data generation portion 51 generates a refractive index distribution (refractive index distribution data) as in each of the first to third embodiments. The element creation portion 52 creates an optical element based on the refractive index distribution generated by the data generation portion 51. That is, in the manufacturing apparatus of this embodiment, a predetermined light beam path is input as input data to the data generation portion 51, and the element creation portion 52 creates an optical element having the refractive index distribution which generates the light beam path. The optical element creation method is, for example, glass processing or the like. Note that if the element creation portion 52 is connected to a network, the element creation portion 52 may obtain the refractive index distribution via the network.

The processing apparatus 10 according to at least one of the above-described embodiments includes the arithmetic section 20. The arithmetic section 20 calculates, based on the estimated output PR calculated by inputting the light beam data D indicating the light beam path to the estimation model M, the updated output UP calculated based on the light beam data D and the estimated output PR, and the evaluation index E of the estimation model M calculated from the ray equation independent of a time which the light beam path follows, the refractive index distribution forming the light beam path. Thus, it is possible to provide a processing apparatus capable of generally obtaining information of an object based on a light beam path, an optical apparatus, a processing method, and a non-transitory storage medium storing a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical apparatus comprising:
an illumination portion including a light source configured to illuminate an object with illumination light forming a light beam path; and
an image sensor which is controlled by a processor, the image sensor being configured to capture the illumination light with which the object is illuminated;
the processor; and
a memory that stores instructions that, when executed by the processor, cause the processor to perform processing,
wherein the processor is configured to:
obtain light beam data indicating the light beam path based on image capturing data captured by the image sensor,
obtain an estimated output by inputting the light beam data indicating the light beam path to an estimation model, the light beam data being formed by a refractive index in the light beam path, the estimation model being a neural network model,
calculate an evaluation index of the estimation model from a ray equation independent of a time which the light beam path follows, wherein
the ray equation is given by $$\frac{dP}{dt} = \frac{c}{r}\frac{\partial n}{\partial Q},$$

the ray equation is defined in an orthogonal coordinate space, and described as follows with one coordinate variable as an intermediary parameter:

$$\frac{d(nu)}{dz} - \sqrt{1 + q' \cdot q'}\frac{\partial n}{\partial q} = 0,$$

and
the evaluation index indicates a deviation between a refractive index distribution obtained in the estimated output and an actual retractive index distribution,
calculate an updated output by inputting the light beam data to an optimized estimation model,
repeatedly execute, based on the below formula, the calculation of the evaluation index, the optimization of the estimation model, and the calculation of the updated output without training data until the evaluation index becomes smaller than a preset threshold value, $$g(u, q, z, \mu) \equiv \left|\frac{d(\mu u)}{dz} - \sqrt{1 + q' \cdot q'}\frac{\partial \mu}{\partial q}\right|^2,$$

and
calculate a refractive index distribution forming the light beam path, based on the estimated output, the updated output, and the evaluation index.

2. The optical apparatus according to claim 1, wherein the ray equation is an evolution equation for spatial coordinate information of the light beam path.

3. The optical apparatus according to claim 1, wherein the light beam data is expressed using, as an intermediary parameter, a coordinate of a spatial element obtained by discretizing the light beam path.

4. The optical apparatus according to claim 3, wherein the ray equation is expressed using the intermediary parameter, and
the refractive index distribution is calculated as a refractive index of the spatial element.

5. The optical apparatus according to claim 4, wherein the coordinates of the spatial element are determined in an orthogonal coordinate space, and
the intermediary parameter is one component of the coordinates determined in the orthogonal coordinate space.

6. The optical apparatus according to claim 1, wherein the processor is configured to iteratively optimize the estimation model based on the evaluation index.

7. The optical apparatus according to claim 6, wherein the estimation model is a neural network model, and
the neural network model is optimized based on an error back-propagation model using the evaluation index as an error.

8. The optical apparatus according to claim 1,
wherein the processor is configured to calculate, based on image capturing data captured by the image sensor, a light beam direction of the illumination light as the light beam path.

9. The optical apparatus according to claim 1, further comprising:
a background pattern to which the illumination light from the illumination portion is applied,
wherein the image sensor is configured to capture the illumination light reflected by the background pattern and transmitted through the object.

10. The optical apparatus according to claim 1, further comprising:
a light beam selection portion having a plurality of color filters which is between the object and the image sensor, the light beam selection portion being configured to transmit light beams corresponding to respective wavelength regions of the plurality of color filters,
wherein the illumination light with which the object is illuminated is captured after passing through the light beam selection portion.

11. The apparatus according to claim 1, wherein
the processor is configured to acquire a refractive index of an object based on the light beam path without the light beam path analytically expressed.

12. A processing method configured to calculate refractive index, the method comprising:
illuminating, by a light source, an object with illumination light to form a light beam path;
capturing, by an image sensor, the illumination light with which the object is illuminated;
obtaining light beam data indicating the light beam path based on image capturing data captured by the image sensor;
obtaining an estimated output by inputting the light beam data indicating the light beam path to an estimation model, the light beam data being formed by a refractive index in the light beam path, and the estimation model being a neural network model;
calculating an evaluation index of the estimation model from a ray equation independent of a time which the light beam path follows, wherein the ray equation is given by $$\frac{dP}{dt} = \frac{c}{n}\frac{\partial n}{\partial Q},$$

the ray equation is defined in an orthogonal coordinate space, and described as follows with one coordinate variable as an intermediary parameter:

$$\frac{d(nu)}{dz} - \sqrt{1+q'\cdot q'}\frac{\partial n}{\partial q} = 0,$$

and
the evaluation index indicates a deviation between a refractive index distribution obtained in the estimated output and an actual retractive index distribution;
calculating an updated output by inputting the light beam data to an optimized estimation model;
repeatedly executing, based on the formular below, the calculation of the evaluation index, the optimization of the estimation model, and the calculation of the updated output without training data until the evaluation index becomes smaller than a preset threshold value, $$g(u, q, z, \mu) \equiv \left|\frac{d(\mu u)}{dz} - \sqrt{1+q'\cdot q'}\frac{\partial \mu}{\partial q}\right|^2;$$

and
calculating, based on the estimated output, the updated output, and the evaluation index, a refractive index distribution forming the light beam path.

13. The processing method of claim 12, further comprising:
acquiring a refractive index of an object based on the light beam path without the light beam path analytically expressed.

14. A method for manufacturing an optical element, comprising:
the processing method according to claim 12; and
creating an optical element based on the refractive index distribution, the optical element having the refractive index distribution.

15. A non-transitory storage medium storing a program for calculating refractive index, the program causing a computer to implement:
controlling a light source to illuminate an object with illumination light to form a light beam path;
controlling an image sensor to capture the illumination light with which the object is illuminated;
obtaining light beam data indicating the light beam path based on image capturing data captured by the image sensor;
obtaining an estimated output by inputting the light beam data indicating the light beam path to an estimation model, the light beam data being formed by a refractive index in the light beam path, and the estimation model being a neural network model,
calculating an evaluation index of the estimation model from a ray equation independent of a time which the light beam path follows, wherein
the ray equation is given by $$\frac{dP}{dt} = \frac{c}{n}\frac{\partial n}{\partial Q},$$

the ray equation is defined in an orthogonal coordinate space, and described as follows with one coordinate variable as an intermediary parameter:

$$\frac{d(nu)}{dz} - \sqrt{1+q'\cdot q'}\frac{\partial n}{\partial q} = 0,$$

and
the evaluation index indicates a deviation between a refractive index distribution obtained in the estimated output and an actual refractive index distribution,
calculating an updated output by inputting the light beam data to an optimized estimation model,
repeatedly executing, based on the formular below, the calculation of the evaluation index, the optimization of the estimation model, and the calculation of the updated output without training data until the evaluation index becomes smaller than a preset threshold value, $$g(u, q, z, \mu) \equiv \left|\frac{d(\mu u)}{dz} - \sqrt{1+q'\cdot q'}\frac{\partial \mu}{\partial q}\right|^2,$$

and
calculating a refractive index distribution forming a light beam path, based on the estimated output, the updated output, and the evaluation index.

16. The processing method of claim 15, wherein the program further causes the computer to implement:
acquiring a refractive index of an object based on the light beam path without the light beam path analytically expressed.

* * * * *